United States Patent
Bachmann

(10) Patent No.: US 11,492,034 B2
(45) Date of Patent: Nov. 8, 2022

(54) REDUCTION OF PLAY OF A WORM GEAR OF AN ELECTROMECHANICAL POWER STEERING SYSTEM BY MEANS OF A BIMETAL SPRING

(71) Applicants: thyssenkrupp Presta AG, Eschen (LI); thyssenkrupp AG, Essen (DE)

(72) Inventor: Andreas Bachmann, Langenargen (DE)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 400 days.

(21) Appl. No.: 16/633,948

(22) PCT Filed: Aug. 1, 2018

(86) PCT No.: PCT/EP2018/070841
§ 371 (c)(1),
(2) Date: Jan. 24, 2020

(87) PCT Pub. No.: WO2019/025481
PCT Pub. Date: Feb. 7, 2019

(65) Prior Publication Data
US 2020/0207407 A1    Jul. 2, 2020

(30) Foreign Application Priority Data

Aug. 4, 2017 (DE) .................. 10 2017 117 724.8

(51) Int. Cl.
*F16H 55/24* (2006.01)
*F16H 57/022* (2012.01)
(Continued)

(52) U.S. Cl.
CPC ........... *B62D 5/0454* (2013.01); *F16H 55/24* (2013.01); *F16H 57/022* (2013.01); *F16H 2057/0213* (2013.01); *F16H 2057/0224* (2013.01)

(58) Field of Classification Search
CPC ..... B62D 5/0454; F16H 55/24; F16H 57/022; F16H 2057/0213; F16H 2057/0224;
(Continued)

(56) References Cited

U.S. PATENT DOCUMENTS

| 2,821,379 | A | * | 1/1958 | Donkin | ..................... F16F 1/10 267/156 |
| 3,091,447 | A | * | 5/1963 | Donkin | ..................... F16F 1/10 267/156 |

(Continued)

FOREIGN PATENT DOCUMENTS

| CN | 102067416 A | 5/2011 |
| CN | 105591184 A | 5/2016 |

(Continued)

OTHER PUBLICATIONS

English Translation of International Search Report issued in PCT/EP2018/070841, dated Sep. 6, 2018.
English Abstract of JP2017077639.

*Primary Examiner* — Jake Cook
*Assistant Examiner* — T. Scott Fix
(74) *Attorney, Agent, or Firm* — thyssenkrupp North America, LLC

(57) ABSTRACT

A worm gear for an electromechanical power steering system of a motor vehicle, includes a worm shaft that meshes with a worm wheel. The worm wheel and the worm shaft are arranged together in a gear housing. An eccentric lever and a bimetallic spring that is operatively connected to the eccentric lever are configured to compensate for a tempera- (Continued)

ture-related play in the engagement between the worm wheel and the worm shaft.

19 Claims, 5 Drawing Sheets

(51) Int. Cl.
*F16H 57/021* (2012.01)
*B62D 5/04* (2006.01)

(58) Field of Classification Search
CPC .... F16F 1/021; F16F 1/025; F16F 1/10; F16F 1/041; F16F 1/12; F16F 1/379; F16F 1/04; F16F 1/06
USPC ............ 180/444; 74/409, 89.14, 500; 267/2, 267/228, 243, 245, 247, 248, 255, 272, 267/273, 275, 276, 277, 286, 290, 155, 267/157, 173, 174, 175, 182, 69, 70, 71, 267/73, 74
See application file for complete search history.

(56) References Cited

U.S. PATENT DOCUMENTS

| | | | | |
|---|---|---|---|---|
| 4,040,307 A | * | 8/1977 | Koster | ............... F16H 1/16 74/425 |
| 2010/0243367 A1 | * | 9/2010 | Suzuki | ............... F16H 57/022 180/444 |
| 2016/0236707 A1 | * | 8/2016 | Oberle | ............... F16H 57/022 |
| 2018/0187768 A1 | * | 7/2018 | Friederich | ............ B62D 5/0409 |
| 2019/0234511 A1 | * | 8/2019 | Diffin | ............... B62D 5/0403 |

FOREIGN PATENT DOCUMENTS

| | | | | |
|---|---|---|---|---|
| DE | 196 24 074 A | | 12/1997 | |
| DE | 102004054510 A1 | * | 5/2006 | ........... B62D 5/0409 |
| DE | 102008043792 A1 | * | 5/2010 | ........... B62D 5/0409 |
| DE | 102010003727 A1 | * | 10/2011 | ........... B62D 5/0409 |
| DE | 102010031425 A1 | * | 1/2012 | ............... F16H 1/16 |
| DE | 10 2013 007 883 A | | 11/2014 | |
| DE | 10 2014 110 306 A | | 1/2016 | |
| DE | 202017100155 U1 | * | 4/2017 | ............ F16H 55/24 |
| DE | 102017200008 A1 | * | 7/2018 | ............ F16H 55/24 |
| GB | 2524606 A | * | 9/2015 | ........... B62D 5/0409 |
| JP | 2000168584 A | * | 6/2000 | |
| JP | 2014-077639 A | | 5/2014 | |
| JP | 2016-028931 A | | 3/2016 | |
| JP | 2017077639 A | | 4/2017 | |
| KR | 1020070018336 A | * | 2/2007 | ............ F16C 19/364 |
| KR | 2008 0000730 A | | 1/2008 | |
| KR | 20100102347 A | * | 9/2010 | ............... F16F 1/06 |
| KR | 1020100107627 A | * | 10/2010 | ........... B62D 5/0409 |
| KR | 20170080899 A | * | 7/2017 | ........... B62D 5/0409 |
| WO | WO-9911502 A1 | * | 3/1999 | ........... B62D 5/0409 |
| WO | WO-03047948 A1 | * | 6/2003 | ........... B62D 5/0409 |
| WO | WO-2014180736 A1 | * | 11/2014 | ........... B62D 5/0403 |
| WO | WO-2016071270 A1 | * | 5/2016 | ............ B62D 5/005 |
| WO | 2016/098721 A | | 6/2016 | |
| WO | WO-2016151305 A1 | * | 9/2016 | ........... B62D 5/0403 |

* cited by examiner

REDUCTION OF PLAY OF A WORM GEAR OF AN ELECTROMECHANICAL POWER STEERING SYSTEM BY MEANS OF A BIMETAL SPRING

CROSS REFERENCE TO RELATED APPLICATIONS

This application is a U.S. National Stage Entry of International Patent Application Serial Number PCT/EP2018/070841, filed Aug. 1, 2018, which claims priority to German Patent Application No. DE 10 2017 117 724.8, filed Aug. 4, 2017, the entire contents of both of which are incorporated herein by reference.

FIELD

The present disclosure generally relates to a worm gear of an electromechanical power steering system.

BACKGROUND

A generic electromechanical power steering system has an electric servo motor, which drives a worm shaft that meshes with a worm wheel arranged on a steering shaft, wherein the worm wheel is operatively connected with an input shaft of a steering gear, and wherein the worm shaft and the steering shaft are mounted rotatably together in a gear housing.

Electromechanical motor vehicle steering systems must be functional both at low temperatures (e.g., as low as −40° C.) and high temperatures (e.g., up to +80° C.). However, components contract at freezing temperatures, while they expand at high temperatures. In the worm gear, there is greater play in the engagement between the gears at low ambient temperatures, as the worm wheel (and/or the worm shaft) contract. This results in undesirable noise in the steering system. At high temperatures, however, the worm wheel expands, thus creating high forces in the gearing that contribute to the wear of the components.

The publication KR 1020080000730 A discloses a shape memory alloy, which is positioned between the gear housing and the outer bearing ring, thus compensating for the temperature differences between the worm shaft and the worm wheel. This material proves to be disadvantageous, because it becomes less and less effective with increasing work cycles and because it is expensive.

Thus a need exists for a worm gear for an electromechanical power steering system, which offers improved temperature compensation as well as noise reduction and which at the same time can be produced cost-effectively.

DETAILED DESCRIPTION

Figure 1:
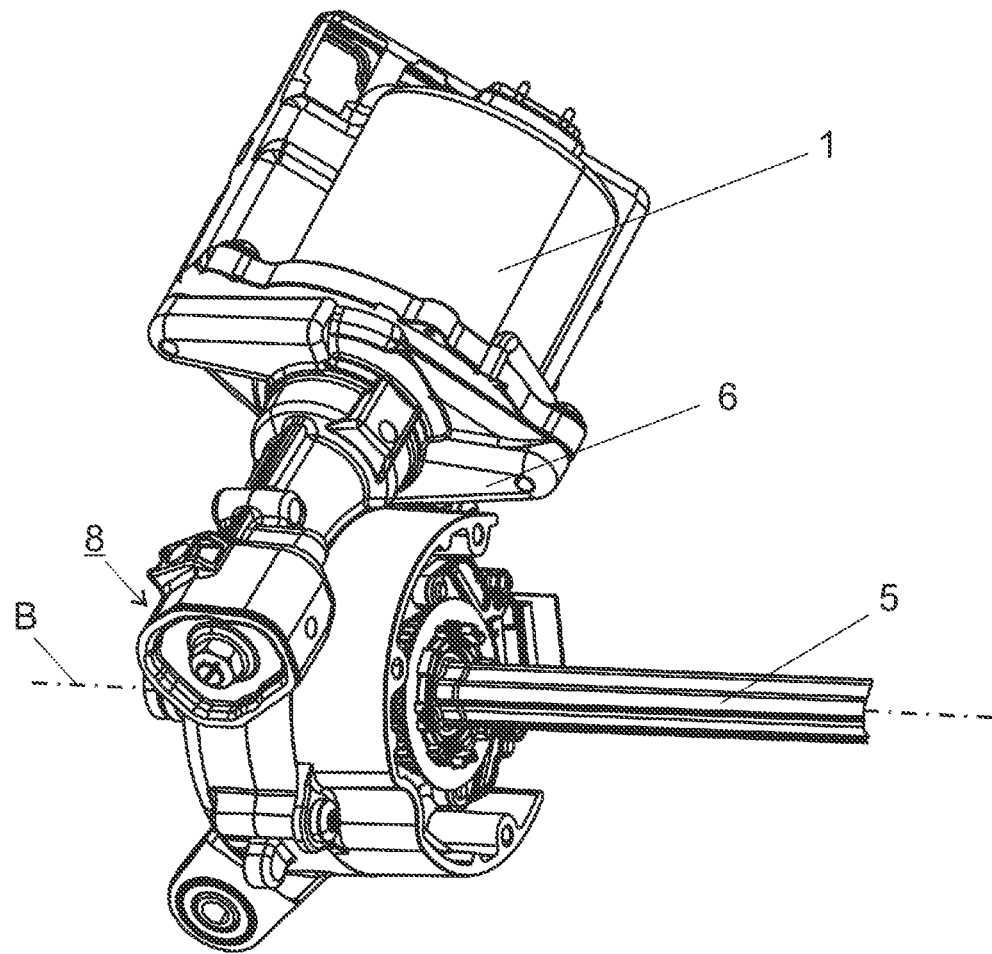
FIG. 1 is a perspective view of a gear of an electromechanical power steering system.
Figure 2:
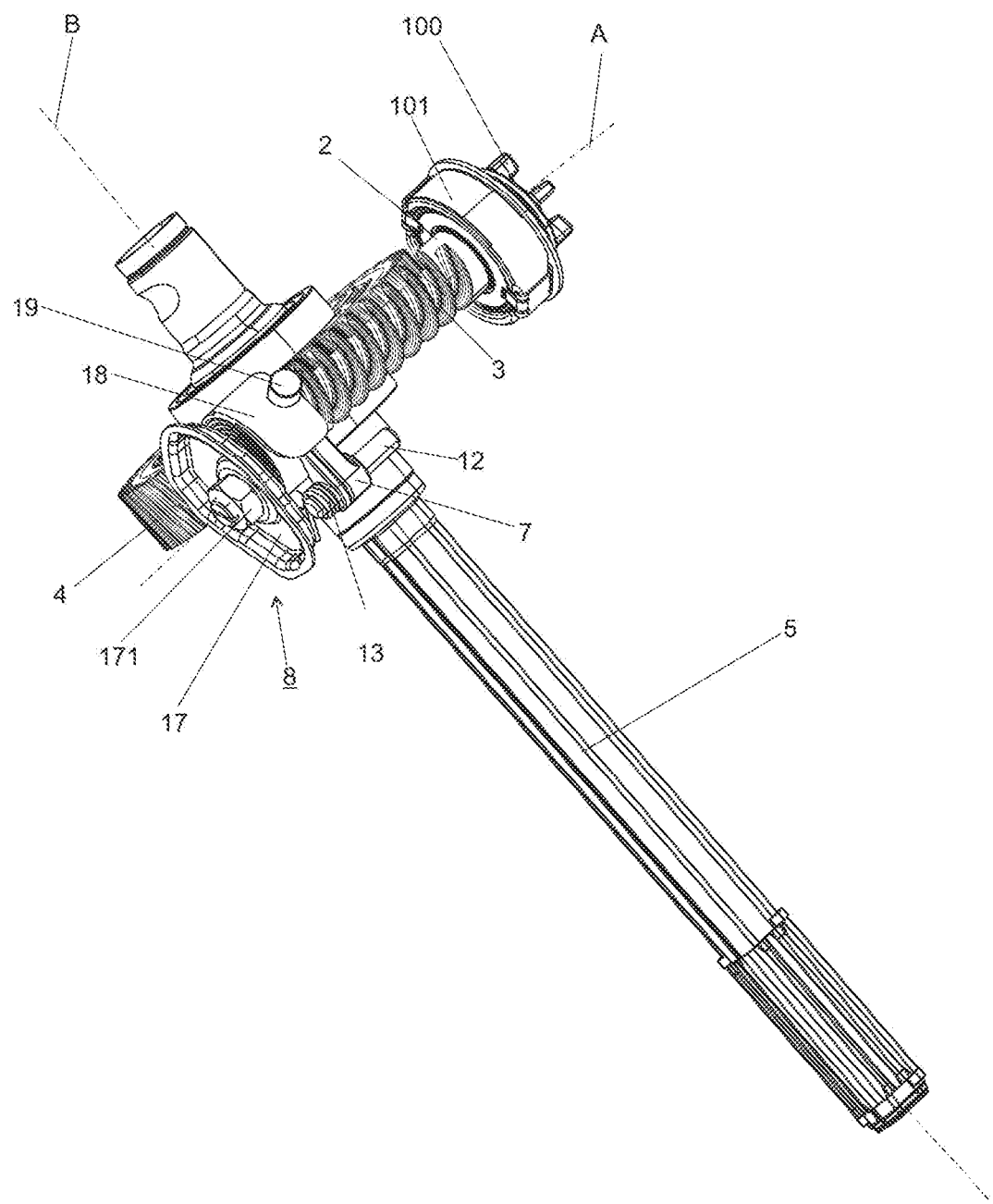
FIG. 2 is a perspective view from above of the gear of FIG. 1.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present invention relates to a worm gear of an electromechanical power steering system of a motor vehicle.

Accordingly, a worm gear for an electromechanical power steering system of a motor vehicle is provided, the worm gear comprising a worm shaft which meshes with a worm wheel via a worm drive, wherein the worm wheel and the worm shaft are arranged together in a gear housing, and wherein an eccentric lever and a bimetallic spring that is operatively connected with the eccentric lever compensate for a temperature-related play in the engagement between the worm wheel and the worm shaft. The bimetallic spring ensures improvements in temperature compensation and noise reduction. In addition, this solution is particularly cost-effective. Preferably, the bimetallic spring is spiral-shaped.

In a preferred embodiment, the eccentric lever is part of a pivot bearing for adjusting a preload of the engagement between the worm shaft and the worm wheel, such that the temperature compensation requires particularly little installation space.

The bimetallic spring preferably is arranged on a tappet, which is mounted non-rotatably in the gear housing. The tappet preferably has a slot on a side facing the worm shaft, in which a second, free end of the bimetallic spring is received.

It is advantageous if a wedge element is provided between the gear housing and the bimetallic spring, which wedge element is braced against a stop pin on the gear housing, wherein the wedge element is arranged between the gear housing and the eccentric lever, such that the eccentric lever can be moved toward the worm wheel or moved away from the worm wheel by moving the wedge element. The eccentric lever preferably has an elastic damper on its outer circumferential surface in the area of the stop pin, such that noise can be reduced. The damper can be ring-shaped, such that it is provided between a rolling bearing of the pivot bearing and the eccentric lever, and is designed with a protrusion which is in contact with the stop pin or the wedge element. The ring-shaped damper may have positive-locking elements on its outer circumferential surface, with which it engages with the contour of the bore of the eccentric lever.

Preferably, the bimetallic spring and the wedge element are designed in such a way that an area of the wedge element with a lesser thickness is arranged in the area of the eccentric lever at higher temperatures, preferably at temperatures greater than or equal to +10° C., and an area of the wedge element with a greater thickness is arranged in the area of the eccentric lever at lower temperatures, preferably at temperatures less than or equal to +5° C. The lesser thickness of the wedge element preferably is in a range between 0.1 mm and 0.14 mm. The greater thickness of the wedge element preferably is in a range between 1.3 mm and 2 mm. This reduces the forces in the gearing at higher temperatures and the play at lower temperatures.

It may be provided that the bimetallic spring pretensions the pivot bearing by resting on a protrusion of the eccentric lever with its first, free end.

In another embodiment, the eccentric lever with the bimetallic spring is preferably arranged in a separate housing.

It is advantageous if the bimetallic spring is spiral-shaped and is arranged on a spring holder, which is received in a first opening of the eccentric lever, wherein the spring holder is supported in the separate housing and wherein a second opening, which is smaller than the first opening, is provided in a tapered area of the eccentric lever for receiving a tappet on which the bimetallic spring rests with its first, free end and which is arranged parallel to the spring holder. In this case, the eccentric lever is not part of the pivot bearing, which is provided for adjusting the preload of the engagement between the worm shaft and the worm wheel. It is therefore preferred that a stop of the eccentric lever is implemented via a stop pin or directly on a pivot lever of the separate pivot bearing.

Furthermore, an electromechanical power steering system having an aforementioned worm gear is provided, wherein the electromechanical power steering system comprises an electric servo motor, which drives the worm shaft that meshes with a worm wheel arranged on a steering shaft via the worm drive, wherein the worm wheel is operatively connected with an input shaft of a steering gear, and wherein the worm shaft and the steering shaft are mounted rotatably together in a gear housing.

A first embodiment of the invention is shown in FIGS. 1 to 5. An electric motor 1 drives a worm shaft 2. The electric motor 1 has a motor shaft, which is coupled with the worm shaft 2 via a coupling such that they rotate together, and which motor shaft is arranged along a worm shaft axis A. The coupling consists of two coupling components, wherein the first coupling component (not shown here) is arranged on the motor shaft, while the second coupling component 100 is arranged on the worm shaft 2. The worm shaft 2 meshes with a worm wheel 4 via a worm drive 3. The worm wheel 4 in turn is connected to a steering shaft 5 in such a manner that the two rotate together, which steering shaft is arranged along an axis B extending transversely to the worm shaft axis A and which rotates about the same. The steering shaft extends between a steering wheel (not shown) and the steering gear of the motor vehicle. The aforementioned components are housed together in a gear housing 6. The worm shaft 2 is supported in the gear housing 6 by means of a bearing arrangement 101 located in proximity to the motor and a bearing arrangement 8 located at a distance from the motor.

Figure 5:
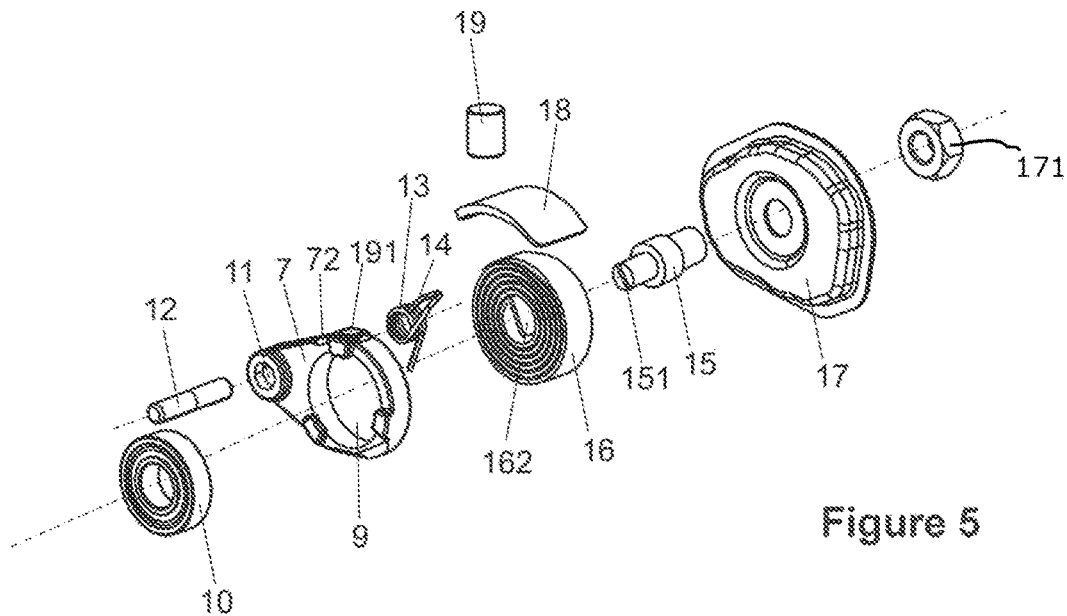
FIG. 5 is an exploded view of the eccentric lever.

The preload between the worm shaft 2 and the worm wheel 4 is created by a drop-shaped eccentric lever 7 arranged at the end of the worm shaft 2 that is located away from the motor, and which is connected with the housing 6 by means of the bearing 8. The eccentric lever 7 comprises a first opening 9 in an area with a larger radius, which extends along the worm shaft axis A, which opening receives a rolling bearing 10 arranged at the end of the worm shaft 2 that is located away from the motor. The rolling bearing 10, which is in the form of a ball bearing, rotatably supports the worm shaft 2 and rests in a corresponding bearing seat of the eccentric lever 7 with its outer race. A second opening 11 is provided in the eccentric lever 7 in a tapered area, or an area with a smaller radius, for receiving a pin 12 of the bearing 8, which pin is arranged parallel to the worm shaft 2, whereby the eccentric lever 7 is supported at the housing 6 such that it can pivot about a pivot axis. The second opening 11 therein is designed smaller than the first opening 9. The first opening 9 is at least three times the size of the second opening 11. Herein, a coil spring 13 or a leg spring, which reacts to tensile loads, concentrically surrounds the pin 12 and engages with a notch 72 on the eccentric lever 7 by means of a hook 14, which notch lies approximately in the plane of the worm wheel 4. Due to the tensile load of the coil spring 13, the eccentric lever 7, which is supported such that it can pivot, is limited in its range of motion and an elastic preload of the worm shaft 2 against the worm wheel 4 is achieved. A bimetallic spring 16 seated on a tappet 15 is arranged between the eccentric lever 7 and a housing cover 17 of the housing 6, as shown in FIG. 5. For this purpose, the tappet 15 comprises a slot 151 on a side facing the worm shaft, in which a second, free end 162 of the bimetallic spring 16 is received. The bimetallic spring 16 surrounds the tappet 15 in an essentially spiral shape. The tappet 15 is mounted non-rotatably in the housing cover 17 of the housing 6 via a nut 171, which is arranged on the side facing away from the worm shaft. For this purpose, the tappet 15 comprises a contour, for example a slot or cross slot, a hexagonal profile or a hexalobular profile, such that a tool can be used in it to tighten the nut 171. A wedge element 18 is provided between the gear housing 6 and the bimetallic spring 16, which wedge element moves in the direction of the eccentric lever or away from the same due to a stop pin 19 arranged in the housing 6, such that the play can be adjusted. The eccentric lever 7 can have an elastic damper 191 in the area of the stop pin 19 for noise minimization, wherein the stop pin moves the wedge element 18 toward this damper or away from it. The bimetallic spring 16 is designed in such a way that it moves the eccentric lever 7, which is braced against the wedge element 18 and the stop pin 19, and the worm shaft 2 supported on the eccentric lever towards the worm wheel 4 at low temperatures to compensate for the play between the worm shaft 2 and the worm wheel 4. At high ambient temperatures, however, the eccentric lever 7 and the worm shaft 2 supported on the same are moved away from the worm wheel 4, such that forces or stresses can be avoided. The bimetallic spring consists of two layers of different metals that are welded, riveted or bonded together, wherein the first layer is preferably an iron alloy, such as steel, and the second layer is copper or zinc, for example.

Figure 3:
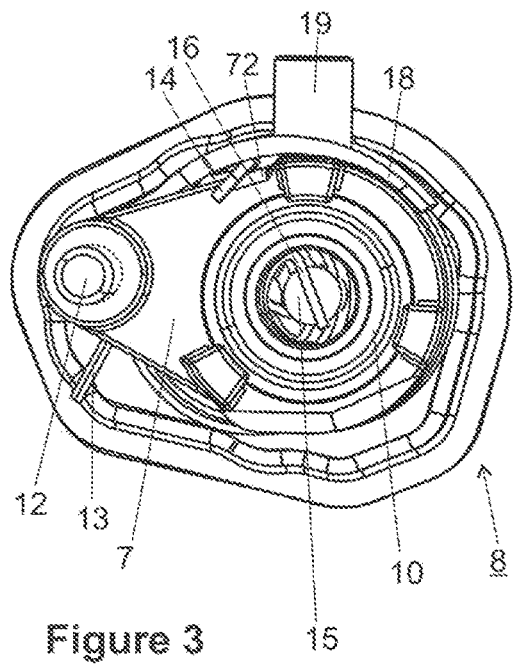
FIG. 3 is top view of an eccentric lever of the worm gear in a different state.
Figure 4:
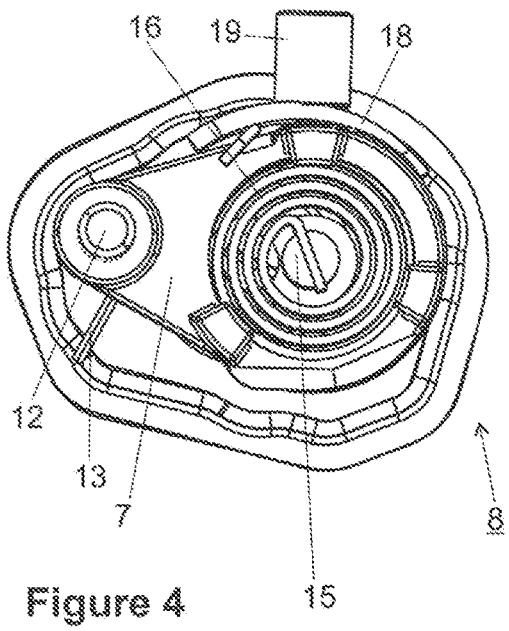
FIG. 4 is a top view of an eccentric lever of the worm gear in a different state.

FIG. 3 shows the arrangement of the eccentric lever at warm temperatures. The bimetallic spring 16 displaces the wedge element in such a way that the eccentric lever 7 moves away from the worm shaft 2, whereby forces and stress in the engagement of the worm shaft 2 and the worm wheel 4 can be avoided. FIG. 4 shows the state at cold temperatures. The bimetallic spring 16 moves the wedge element 18 into an area of greater thickness and the worm shaft 2 is moved toward the worm wheel 4, whereby the play in the engagement between the worm shaft 2 and the worm wheel 4 is reduced.

Figure 6:
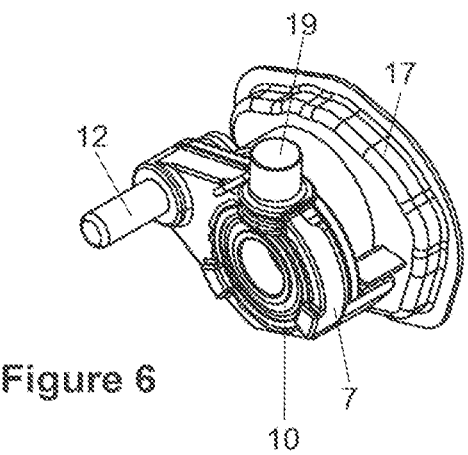
FIG. 6 is a perspective view of another eccentric lever without a coil spring.
Figure 7:
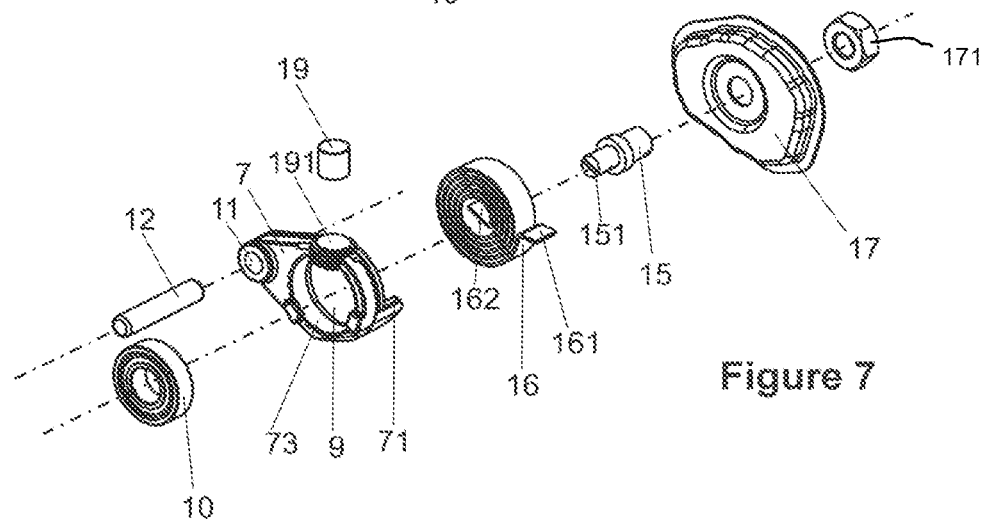
FIG. 7 is an exploded view of the embodiment of FIG. 6.
Figure 8:
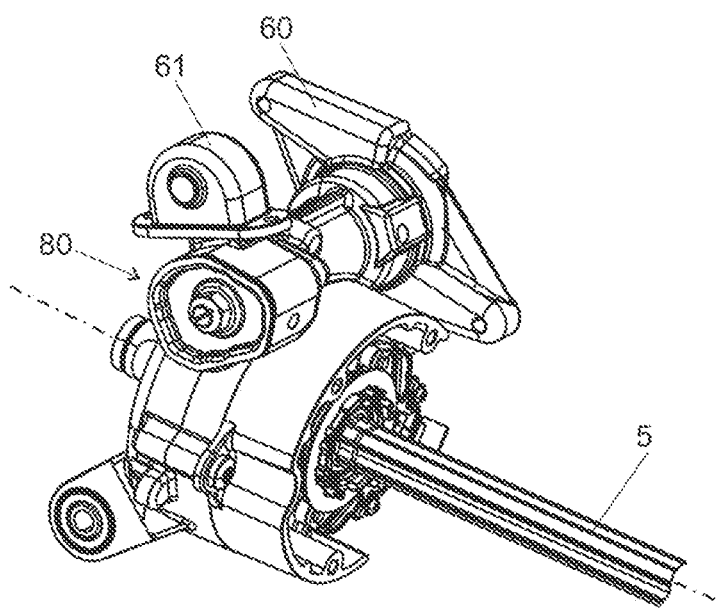
FIG. 8 is a perspective view of a gear with an eccentric lever arranged in a separate housing.
Figure 9:
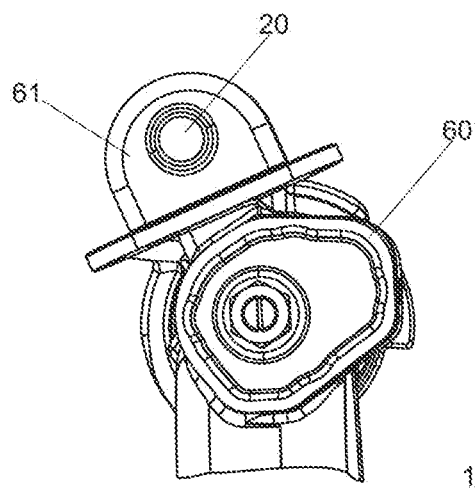
FIG. 9 is top view of the eccentric lever of FIG. 8.

FIGS. 6 and 7 show an embodiment without the coil spring. Herein, the bimetallic spring 16 provides the necessary pre-tensioning forces and compensates for temperature differences in the gear. For this purpose, the bimetallic spring 16 rests on a protrusion 71 of the eccentric lever 7 with its first, free end 161. The eccentric lever is supported on the housing 6 via a stop pin 9. A ring-shaped damping element 73 is provided between the eccentric lever 7 and the rolling bearing 10 for noise reduction, which damping element comprises a protrusion 191 which protrudes into an opening of the eccentric lever and which is in contact with the stop pin 19. The eccentric lever 7 has positive-locking elements in the first opening 9, which elements interact with the positive-locking elements of the damper sleeve 73.

Figure 10:
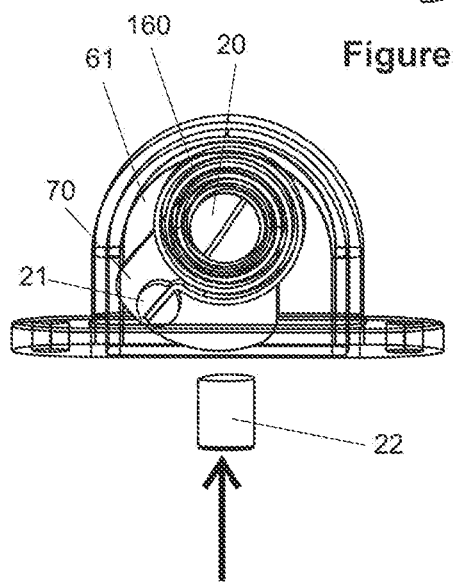
FIG. 10 is a perspective view of the operating principle of the eccentric lever of FIG. 8.
Figure 11:
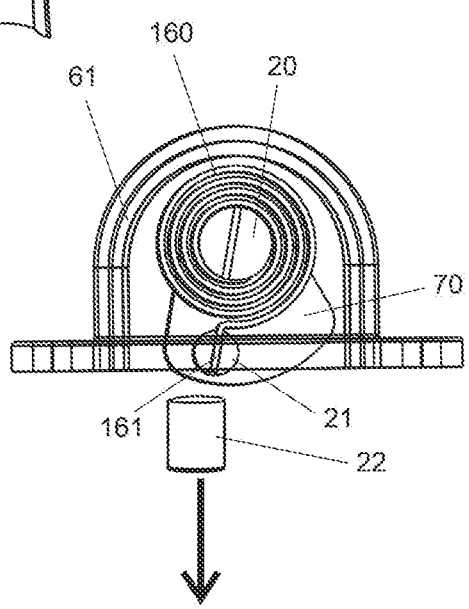
FIG. 11 is a perspective view of the operating principle of the eccentric lever of FIG. 8.
Figure 12:
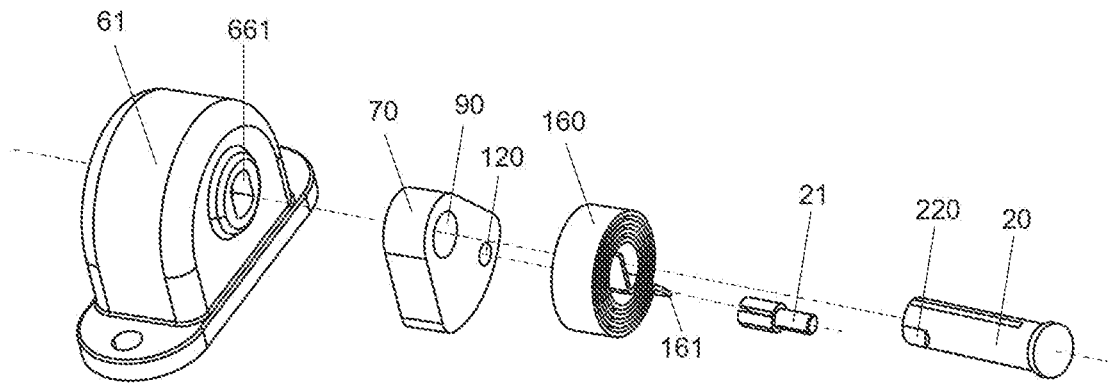
FIG. 12 is an exploded view of the eccentric lever of FIG. 8.

Another embodiment of the invention is shown in FIGS. 8 to 12. An eccentric lever 70 with a bimetallic spring 160 is arranged in a separate housing 61 on the outer circumference of the worm gear housing 60. The spiral-shaped bimetallic spring 160 is arranged on a spread or not completely slotted spring holder 20, which sits in the center of the spring 160. The spring holder 20 comprises an anti-rotation lock 220, which interacts with an anti-rotation lock 661 of the housing 61. The drop-shaped eccentric lever 70 comprises a first opening 90 in an area with a smaller radius, which opening accommodates the spring holder 20. The spring holder 20 is housed in the housing 61 and in turn supports the eccentric lever 70 via the first opening 90. A second, significantly smaller opening 120 is provided in a tapered area of the eccentric lever 70 in an area with a larger radius for receiving a tappet 21 arranged parallel to the spring holder 20, on which tappet the bimetallic spring 160 rests with its outer end. At low temperatures, the eccentric lever 70 is extended by means of the metal spring 160, as shown in FIG. 11, to compensate for the play between worm shaft 2 and worm wheel 4. On the other hand, the lever 70 is retracted at high or warm ambient temperatures, as shown in FIG. 10, to avoid forces or stresses. The stop of the eccentric lever 70 is implemented by a movable stop pin 22 or directly on a pivot lever of the pivot bearing 23, which comprises a damper (not shown) in the engagement area for this purpose.

What is claimed is:

1. A worm gear for an electromechanical power steering system of a motor vehicle, comprising:
    a gear housing;
    a worm wheel;
    a worm shaft that meshes with the worm wheel via a worm drive;
    the worm wheel and the worm shaft arranged together in the gear housing;
    an eccentric lever;
    a bimetallic spring that is operatively connected to the eccentric lever, the bimetallic spring and the eccentric lever configured to compensate for a temperature-related play in the engagement between the worm wheel and the worm shaft; and
    a wedge element provided between the gear housing and the bimetallic spring, said wedge element braced against a stop pin on the gear housing, wherein the wedge element is arranged between the gear housing and the eccentric lever, such that the eccentric lever is movable toward the worm wheel or away from the worm wheel by moving the wedge element.

2. The worm gear of claim 1 wherein the eccentric lever is part of a pivot bearing configured to adjust the engagement between the worm shaft and the worm wheel.

3. The worm gear of claim 1 wherein the bimetallic spring is spiral-shaped and is arranged on a tappet which is mounted non-rotatably in the gear housing.

4. The worm gear of claim 1 wherein the bimetallic spring and the wedge element are configured such that an area of the wedge element with a lesser thickness is arranged proximate the eccentric lever at ambient temperatures equal to or greater than 10° C., and an area of the wedge element with a greater thickness is arranged proximate the eccentric lever at ambient temperatures equal to or less than 5° C.

5. The worm gear of claim 2 wherein the bimetallic spring is configured to pretension the pivot bearing and rests on a protrusion of the eccentric lever with a first, free end.

6. The worm gear of claim 1 wherein the eccentric lever and the bimetallic spring are arranged in a separate housing.

7. A worm gear for an electromechanical power steering system of a motor vehicle, comprising:
    a gear housing;
    a worm wheel;
    a worm shaft that meshes with the worm wheel via a worm drive;
    the worm wheel and the worm shaft arranged together in the gear housing;
    an eccentric lever; and
    a bimetallic spring that is operatively connected to the eccentric lever, the bimetallic spring and the eccentric lever configured to compensate for a temperature-related play in the engagement between the worm wheel and the worm shaft,
    wherein the eccentric lever and the bimetallic spring are arranged in a separate housing,
    wherein the bimetallic spring is spiral-shaped and is arranged on a spring holder, which is received in a first opening of the eccentric lever, wherein the spring holder is supported in the separate housing, and wherein a second opening, which is smaller than the first opening, is provided in a tapered area of the eccentric lever for receiving a tappet on which the bimetallic spring rests with a first, free end and which is arranged parallel to the spring holder.

8. The worm gear of claim 6 wherein a stop of the eccentric lever is implemented via a stop pin or directly on a pivot lever of a pivot bearing.

9. A worm gear for an electromechanical power steering system of a motor vehicle, comprising:
    a gear housing;
    a worm wheel;
    a worm shaft that meshes with the worm wheel via a worm drive;
    the worm wheel and the worm shaft arranged together in the gear housing;
    an eccentric lever; and
    a bimetallic spring that is operatively connected to the eccentric lever, the bimetallic spring and the eccentric lever configured to compensate for a temperature-related play in the engagement between the worm wheel and the worm shaft, wherein the bimetallic spring is coaxially aligned with a largest opening of the eccentric lever.

10. The worm gear of claim 9 wherein the bimetallic spring, the worm shaft, and the largest opening of the eccentric lever are coaxially aligned about a longitudinal axis along which the worm shaft extends.

11. The worm gear of claim 9 comprising a wedge element that is arranged between the gear housing and the eccentric lever such that the eccentric lever is movable toward or away from the worm wheel by translation of the wedge element.

12. The worm gear of claim 11 wherein the wedge element has a first distal end that is thicker than a second distal end.

13. The worm gear of claim 11 wherein the wedge element has an arcuate shape that spans less than 180 degrees.

14. The worm gear of claim 11 wherein a radius through which the wedge element extends is greater than an outermost radius of the bimetallic spring.

15. The worm gear of claim 9 wherein the eccentric lever is configured to rotate about a second opening of the eccentric lever that is spaced apart from the largest opening and from the bimetallic spring.

16. The worm gear of claim 9 wherein the worm shaft extends along a longitudinal axis, with the longitudinal axis extending through the bimetallic spring and the eccentric lever, wherein a portion of the eccentric lever extends farther from the longitudinal axis than any portion of the bimetallic spring.

17. The worm gear of claim 9 comprising a rolling bearing that is received in the largest opening of the eccentric lever.

18. The worm gear of claim 9 comprising a coil spring that is coaxial with a pivot point about which the eccentric lever is configured to rotate.

19. The worm gear of claim 9 comprising a coil spring that engages with a periphery of the eccentric lever.

\* \* \* \* \*